US008213446B2

(12) United States Patent
Meagher et al.

(10) Patent No.: US 8,213,446 B2
(45) Date of Patent: Jul. 3, 2012

(54) FRAME-INTERLEAVING SYSTEMS AND METHODS FOR 100G OPTICAL TRANSPORT ENABLING MULTI-LEVEL OPTICAL TRANSMISSION

(75) Inventors: Kevin S. Meagher, Bowie, MD (US); John P. Mateosky, West River, MD (US)

(73) Assignee: Ciena Corporation, Linthicum, MD (US)

( * ) Notice: Subject to any disclaimer, the term of this patent is extended or adjusted under 35 U.S.C. 154(b) by 673 days.

(21) Appl. No.: 11/964,468

(22) Filed: Dec. 26, 2007

(65) Prior Publication Data

US 2009/0169204 A1 Jul. 2, 2009

(51) Int. Cl.
*H04L 12/28* (2006.01)
(52) U.S. Cl. ........................................................ 370/419
(58) Field of Classification Search .................. 370/419, 370/498, 476, 389
See application file for complete search history.

(56) References Cited

U.S. PATENT DOCUMENTS

| 6,351,832 | B1 * | 2/2002 | Wei ............................... 714/701 |
| 2003/0048813 | A1 | 3/2003 | Lahav et al. |
| 2004/0096213 | A1 | 5/2004 | Perkins et al. |
| 2005/0286521 | A1 | 12/2005 | Chiang et al. |
| 2006/0126641 | A1 * | 6/2006 | Song et al. ............... 370/395.51 |
| 2007/0248121 | A1 | 10/2007 | Zou |

OTHER PUBLICATIONS

John McDonough; "Moving standards to 100 Gbe and beyond"; IEEE Communications Magazine, IEEE Service Center, Piscataway, US., vol. 45, No. 11, Nov. 1, 2007, pp. 6-9, XP011196611; ISSN: 0163-6804; the whole document.
Elbers, Jorg-Peter, Peers Neil; "OTN-Compatible 40Gbe and 100 GbE Interfaces/ 100GbE serial PHY considerations"; IEEE802 ORG. [Online]; Nov. 8, 2007, pp. 1-14, XP002553575; www.Ieee802.org; Retrieved from the Internet: URL:http://www.ieee802.org/3/hssg/public/n ov07/elbers_01_1106.pdf [[retrieved on Nov. 2, 2009] the whole document.
"Interfaces for the Optical Transport Network (OTN): G.709/Y.1331 (Mar. 2003)" ITU-T Standard in Force (I), International Telecommunication Union, Geneva, CH, No. G.709/Y.1331 (Mar. 2003); Mar. 16, 2003, XP01740084817. Mapping of client signals.

* cited by examiner

Primary Examiner — Man Phan
Assistant Examiner — Nourali Mansoury
(74) Attorney, Agent, or Firm — Clements Bernard PLLC; Christopher L. Bernard; Lawrence A. Baratta, Jr.

(57) ABSTRACT

The present invention provides frame-interleaving systems and methods for Optical Transport Unit K (OTUK) (i.e. Optical Transport Unit 4 (OTU4)), 100 Gb/s Ethernet (100 GbE), and other 100 Gb/s (100 G) optical transport enabling multi-level optical transmission. The frame-interleaving systems and methods of the present invention support the multiplexing of sub-rate clients, such as 10×10 Gb/s (10 G) clients, 2×40 Gb/s (40 G) plus 2×10 G clients, etc., into two 50 Gb/s (50 G) transport signals, four 25 Gb/s (25 G) transport signals, etc. that are forward error correction (FEC) encoded and carried on a single wavelength to provide useful, efficient, and cost-effective 100 G optical transport solutions today. In one exemplary configuration, a 100 G client signal or 100 G aggregate client signal carried over two or more channels is frame-deinterleaved, followed by even/odd sub-channel FEC encoding and framing. In another exemplary configuration, a 100 G client signal or 100 G aggregate client signal carried over two or more channels is received and processed by a single 100 G FEC framer, followed by frame-deinterleaving into two or more sub-rate channels.

19 Claims, 15 Drawing Sheets

FRAME-INTERLEAVING SYSTEMS AND METHODS FOR 100G OPTICAL TRANSPORT ENABLING MULTI-LEVEL OPTICAL TRANSMISSION

FIELD OF THE INVENTION

The present invention relates generally to the optical networking field. More specifically, the present invention relates to frame-interleaving systems and methods for Optical Transport Unit K (OTUK) (i.e. Optical Transport Unit 4 (OTU4)), 100 Gb/s Ethernet (100 GbE), and other 100 Gb/s (100 G) optical transport enabling multi-level optical transmission. The frame-interleaving systems and methods of the present invention support the multiplexing of sub-rate clients, such as 10×10 Gb/s (10 G) clients, 2×40 Gb/s (40 G) plus 2×10 G clients, etc., into two 50 Gb/s (50 G) transport signals, four 25 Gb/s (25 G) transport signals, etc. that are forward error correction (FEC) encoded and carried on a single wavelength to provide useful, efficient, and cost-effective 100 G optical transport solutions today. In one exemplary configuration, a 100 G client signal or 100 G aggregate client signal carried over two or more channels is frame-deinterleaved, followed by even/odd sub-channel FEC encoding and framing. In another exemplary configuration, a 100 G client signal or 100 G aggregate client signal carried over two or more channels is received and processed by a single 100 G FEC framer, followed by frame-deinterleaving into two or more sub-rate channels.

BACKGROUND OF THE INVENTION

At present, state-of-the-art 100 Gb/s (100 G) optical transport work is occurring in two areas: 1) transmission and modulation format development and 2) framing and standards body work required to define 100 G optical transport framing and multiplexing standards. Transmission and modulation format development falls into two categories: 1) 100 G serial optical transmission as demonstrated by network gear providers and other researchers performing 100 G optical transmission "hero" experiments, which focus on the accumulation of knowledge but not necessarily efficiency or cost-effectiveness, and 2) realistic transmission and modulation schemes that are based on present and future optical and electronic technologies, which typically involve transmission and modulation schemes that attempt to provide greater spectral efficiency, solve dispersion problems, and limit baud rates by providing multiple bits-per-symbol encodings and/or by using enhanced forward error correction (FEC) schemes, such as duo-binary modulation, Differential Phase Shift Keying (DPSK), Differential Quadrature Phase Shift Keying (DQPSK), and the like.

In general, standards bodies are looking several years into the future to define framing formats (i.e. Optical Transport Unit 4 (OTU4) in International Telecommunications Union (ITU-T) Study Group 15), backplane interface standards, and multiplexing schemes, which are unrealizable for 100 G optical transport today but will become feasible in the future. Thus, for network providers that desire 100 G optical transport solutions sooner rather than later, a disconnect exists.

At present, state-of-the-art 100 G optical transmission systems/methods do not exist in deployed networks. They are, however, actively being researched and designed to address the need for ever-increasing packet bandwidth and logical flow requirements. Long-haul 100 G serial optical transmission is possible but very unrealistic today given present optical and electronic technologies, and the same is true for the foreseeable future. Coupled with the forthcoming OTU4 100 G optical framing standard, the stage is set for present optical and electronic technologies to fall short in delivering an efficient and cost-effective 100 G optical transport system that suits the needs of today's bandwidth-hungry network providers. Thus, what is needed in the art is an approach that preserves standard framing formats and interoperability while enabling spectrally efficient 100 G optical transport today.

BRIEF SUMMARY OF THE INVENTION

In various exemplary embodiments, the present invention provides frame-interleaving systems and methods for Optical Transport Unit K (OTUK) (i.e. Optical Transport Unit 4 (OTU4)), 100 Gb/s Ethernet (100 GbE), and other 100 Gb/s (100 G) optical transport enabling multi-level optical transmission. The frame-interleaving systems and methods of the present invention support the multiplexing of sub-rate clients, such as 10×10 Gb/s (10 G) clients, 2×40 Gb/s (40 G) plus 2×10 G clients, etc., into two 50 Gb/s (50 G) transport signals, four 25 Gb/s (25 G) transport signals, etc. that are forward error correction (FEC) encoded and carried on a single wavelength to provide useful, efficient, and cost-effective 100 G optical transport solutions today. In one exemplary configuration, a 100 G client signal or 100 G aggregate client signal carried over two or more channels is frame-deinterleaved, followed by even/odd sub-channel FEC encoding and framing. In another exemplary configuration, a 100 G client signal or 100 G aggregate client signal carried over two or more channels is received and processed by a single 100 G FEC framer, followed by frame-deinterleaving into two or more sub-rate channels. Advantageously, the frame-interleaving systems and methods of the present invention can be implemented in digital circuitry (i.e. a field-programmable gate array (FPGA) or the like) available today.

In one exemplary embodiment, the present invention provides a transport method, including: receiving an aggregate client signal; and deinterleaving the aggregate client signal across N paths, each of the N paths carrying one of every N frames into which the aggregate client signal is deinterleaved. Each of the N paths include a set of Optical Transport Network (OTN) overhead for individual path operations, administration, maintenance, and provisioning (OAM&P). Each of the N paths also include a set of Optical Transport Network (OTN) overhead for coordinated path operations, administration, maintenance, and provisioning (OAM&P). The transport method also includes performing forward error correction (FEC) decoding for each of the N paths one of prior to and subsequent to deinterleaving, performing overhead monitoring/termination/generation for each of the N paths one of prior to and subsequent to deinterleaving, performing forward error correction (FEC) encoding for each of the N paths one of prior to and subsequent to deinterleaving, performing Optical Data Unit K (ODUK) mapping for each of the N paths subsequent to deinterleaving, performing Generic Framing Protocol (GFP) mapping for each of the N paths subsequent to deinterleaving, and/or inserting one or more frame buffers into selected paths of the N paths subsequent to deinterleaving. The aggregate client signal consists of an aggregate client signal selected from the group consisting of an Optical Transport Unit 4 (OTU4) client signal, an Optical Transport Unit K (OTUK) client signal, a constant bit rate (CBR) client signal, a 100 Gb/s (100 G) client signal, a 100 Gb/s Ethernet (100 GbE) Local Area Network (LAN) client signal, a 100 Gb/s Ethernet (100 GbE) Wide Area Network (WAN) client signal, a 100 Gb/s Ethernet (100 GbE) Generic Framing Protocol (GFP)-mapped client signal, a 10 Gb/s Ethernet (10 GbE)

client signal, an Optical Channel 192 (OC192) client signal, an Optical Transport Unit 2 (OTU2) client signal, an Optical Transport Unit 2E (OTU2E) client signal, an Optical Data Unit 2 (ODU2) client signal, an Optical Data Unit 2 (ODU2) Local Area Network (LAN) (ODU2L) client signal, a subset thereof, an aggregation thereof, and a combination thereof. The N frames consist of OTUK frames.

In another exemplary embodiment, the present invention provides a transport method, including: receiving N transport signals distributed across N paths; and interleaving the N transport signals to form an aggregate client signal, each of the N paths carrying one of every N frames from which the aggregate client signal is interleaved. Each of the N paths include a set of Optical Transport Network (OTN) overhead for individual path operations, administration, maintenance, and provisioning (OAM&P). Each of the N paths also include a set of Optical Transport Network (OTN) overhead for coordinated path operations, administration, maintenance, and provisioning (OAM&P). The transport method also includes performing forward error correction (FEC) decoding for each of the N paths prior to interleaving, performing overhead monitoring/termination/generation for each of the N paths one of prior to and subsequent to interleaving, performing forward error correction (FEC) encoding for each of the N paths one of prior to and subsequent to interleaving, performing Optical Data Unit K (ODUK) demapping for each of the N paths prior to interleaving, performing Generic Framing Protocol (GFP) demapping for each of the N paths prior to interleaving, and/or inserting one or more frame buffers into selected paths of the N paths prior to interleaving. The aggregate client signal consists of an aggregate client signal selected from the group consisting of an Optical Transport Unit 4 (OTU4) client signal, an Optical Transport Unit K (OTUK) client signal, a constant bit rate (CBR) client signal, a 100 Gb/s (100 G) client signal, a 100 Gb/s Ethernet (100 GbE) Local Area Network (LAN) client signal, a 100 Gb/s Ethernet (100 GbE) Wide Area Network (WAN) client signal, a 100 Gb/s Ethernet (100 GbE) Generic Framing Protocol (GFP)-mapped client signal, a 10 Gb/s Ethernet (10 GbE) client signal, an Optical Channel 192 (OC192) client signal, an Optical Transport Unit 2 (OTU2) client signal, an Optical Transport Unit 2E (OTU2E) client signal, an Optical Data Unit 2 (ODU2) client signal, an Optical Data Unit 2 (ODU2) Local Area Network (LAN) (ODU2L) client signal, a subset thereof, an aggregation thereof, and a combination thereof. The N frames consist of OTUK frames.

In a further exemplary embodiment, the present invention provides transport system, including: one or more inputs for receiving an aggregate client signal; and a deinterleaver for deinterleaving the aggregate client signal across N paths, each of the N paths carrying one of every N frames into which the aggregate client signal is deinterleaved.

In a still further exemplary embodiment, the present provides a transport system, including: one or more inputs for receiving N transport signals distributed across N paths; and an interleaver for interleaving the N transport signals to form an aggregate client signal, each of the N paths carrying one of every N frames from which the aggregate client signal is interleaved.

In a still further exemplary embodiment, the present provides a transport method, including: transporting one of every N frames associated with an aggregate client signal over a selected one of N channels; wherein each of the N channels include a set of Optical Transport Network (OTN) overhead for individual path operations, administration, maintenance, and provisioning (OAM&P); and wherein each of the N channels include a set of Optical Transport Network (OTN) overhead for coordinated path operations, administration, maintenance, and provisioning (OAM&P).

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Figure 1:
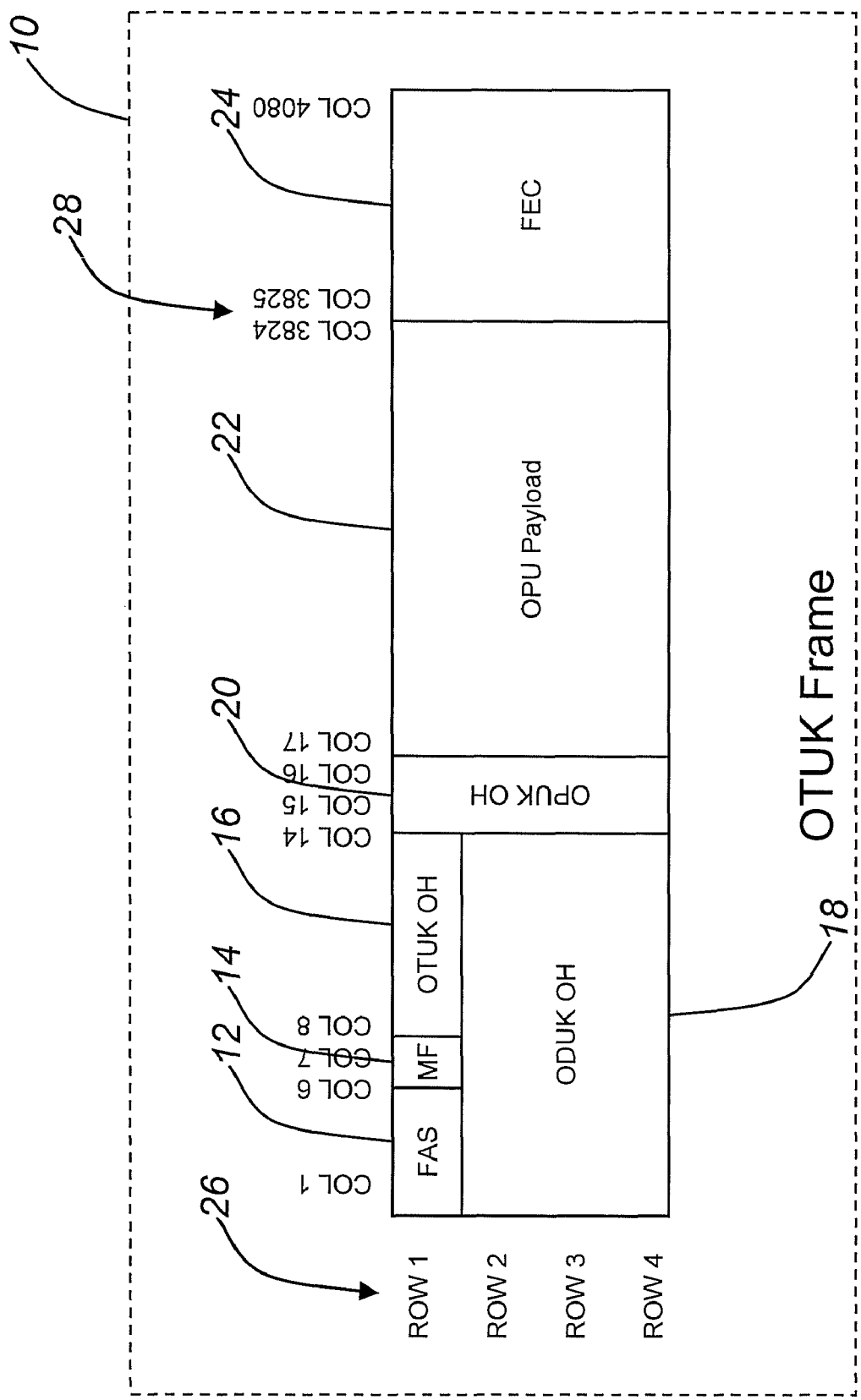
FIG. 1 is a schematic diagram illustrating one exemplary embodiment of an Optical Transport Unit K (OTUK) frame used in conjunction with the frame-interleaving systems and methods of the present invention.

Again, the present invention provides frame-interleaving systems and methods for Optical Transport Unit K (OTUK) (i.e. Optical Transport Unit 4 (OTU4)), 100 Gb/s Ethernet (100 GbE), and other 100 Gb/s (100 G) optical transport enabling multi-level optical transmission. The frame-interleaving systems and methods of the present invention support the multiplexing of sub-rate clients, such as 10×10 Gb/s (10 G) clients, 2×40 Gb/s (40 G) plus 2×10 G clients, etc., into two 50 Gb/s (50 G) transport signals, four 25 Gb/s (25 G) transport signals, etc. that are forward error correction (FEC) encoded and carried on a single wavelength to provide useful, efficient, and cost-effective 100 G optical transport solutions today. In one exemplary configuration, a 100 G client signal or 100 G aggregate client signal carried over two or more channels is frame-deinterleaved, followed by even/odd sub-channel FEC encoding and framing. In another exemplary configuration, a 100 G client signal or 100 G aggregate client signal carried over two or more channels is received and processed by a single 100 G FEC framer, followed by frame-deinterleaving into two or more sub-rate channels. Advantageously, the frame-interleaving systems and methods of the present invention can be implemented in digital circuitry (i.e. a field-programmable gate array (FPGA) or the like) available today. The frame-interleaving approach of the present invention is particularly applicable to the sub-rate multiplexing of multiple sub-rate client signals into a 100 G transport signals, or a 2×50 G or 4×25 G architecture.

At present, serial 100 G optical transmission is not feasible from a performance and cost standpoint. However, 100 G optical transmission is very feasible if alternate modulation schemes are used to improve the spectral efficiency and baud rate of the optical transmission, without compromising the overall throughput or regenerated distance limits. Modulation schemes, such as Return-to-Zero-Differential Quadrature Phase Shift Keying (RZ-DQPSK) and the like, allow for multiple bits per symbol, and also allow for a 100 G logical flow to be broken into 2×50 G or 4×25 G logical flows for processing using electronic components available today. If a modulation scheme is developed that allows a 100 G OTU4-framed signal (the proposed International Telecommunications Union (ITU-T) transport framing standard for 100 G optical transmission) to be carried seamlessly by spectrally efficient means, using today's electronic components, this would allow for a much more cost-efficient deployment of 100 G optical transport gear. This would occur much sooner than serial 100 G optical transmission, while providing for much greater distance performance without compromising client-side interoperability or requiring exotic electronic component development.

100 G transponder and multiplexing transponder (MUX-PONDER) applications are vital in long haul optical transport networks as optical fiber bandwidth continues to be absorbed by voice, video, and other data-centric applications, first in highly populated urban networks, and eventually in worldwide networks. Single wavelength, spectrally efficient transport techniques solve this problem without compromising regeneration distances.

In general, the frame-interleaving systems and methods of the present invention deinterleave OTU4 frames across N paths (where N=2, 4, 8, etc.). Each path carries one of every N frames. For the two-path (i.e. N=2) case, for example, each path carries one-half of the frames—one path carrying the odd frames and the other path carrying the even frames. Each path contains a full set of Optical Transport Network (OTN) overhead allowing for individual path operations, administration, maintenance, and provisioning (OAM&P), as well as combined OAM&P. For example, each path can be individually framed, FEC encoded/decoded, monitored for an alarm indication signal (AIS), an open connection indication (OCI), a locked (LCK) state, and a backwards defect indication (BDI). In the two-path (i.e. N=2) implementation, each path can be monitored individually for bit errors because an OTN bit parity (BIP) is calculated over the current frame and inserted two frames later. Thus, deinterleaving as applied to client mapping and multiplexing allows a client signal to be mapped directly into the deinterleaved frames instead of having to map/multiplex directly into a single high-speed payload.

FIG. 1 is a schematic diagram illustrating one exemplary embodiment of an Optical Transport Unit K (OTUK) frame 10 used in conjunction with the frame-interleaving systems and methods of the present invention. As will be readily apparent to those of ordinary skill in the art, the OTUK frame 10 includes frame alignment (FAS) bytes 12, multi-frame alignment (MF) bytes 14, OTUK overhead (OH) bytes 16, Optical Data Unit K overhead (ODUK OH) bytes 18, Optical Payload Unit K overhead (OPUK OH) bytes 20, Optical Payload Unit (OPU) payload bytes 22, and FEC bytes 24 arranged over a plurality of rows 26 and columns 28.

Figure 2:
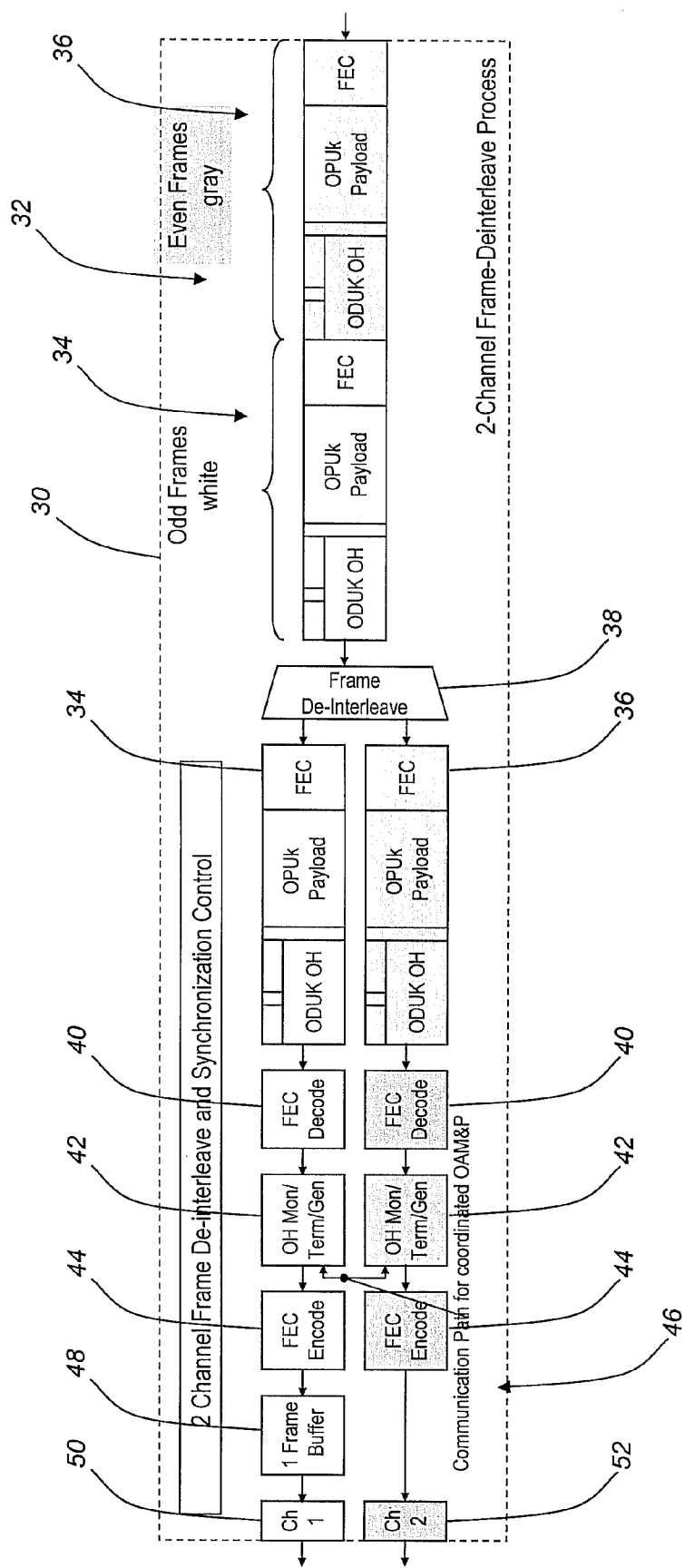
FIG. 2 is a schematic diagram illustrating one exemplary embodiment of a two-channel frame-deinterleaving process of the present invention.
Figure 3:
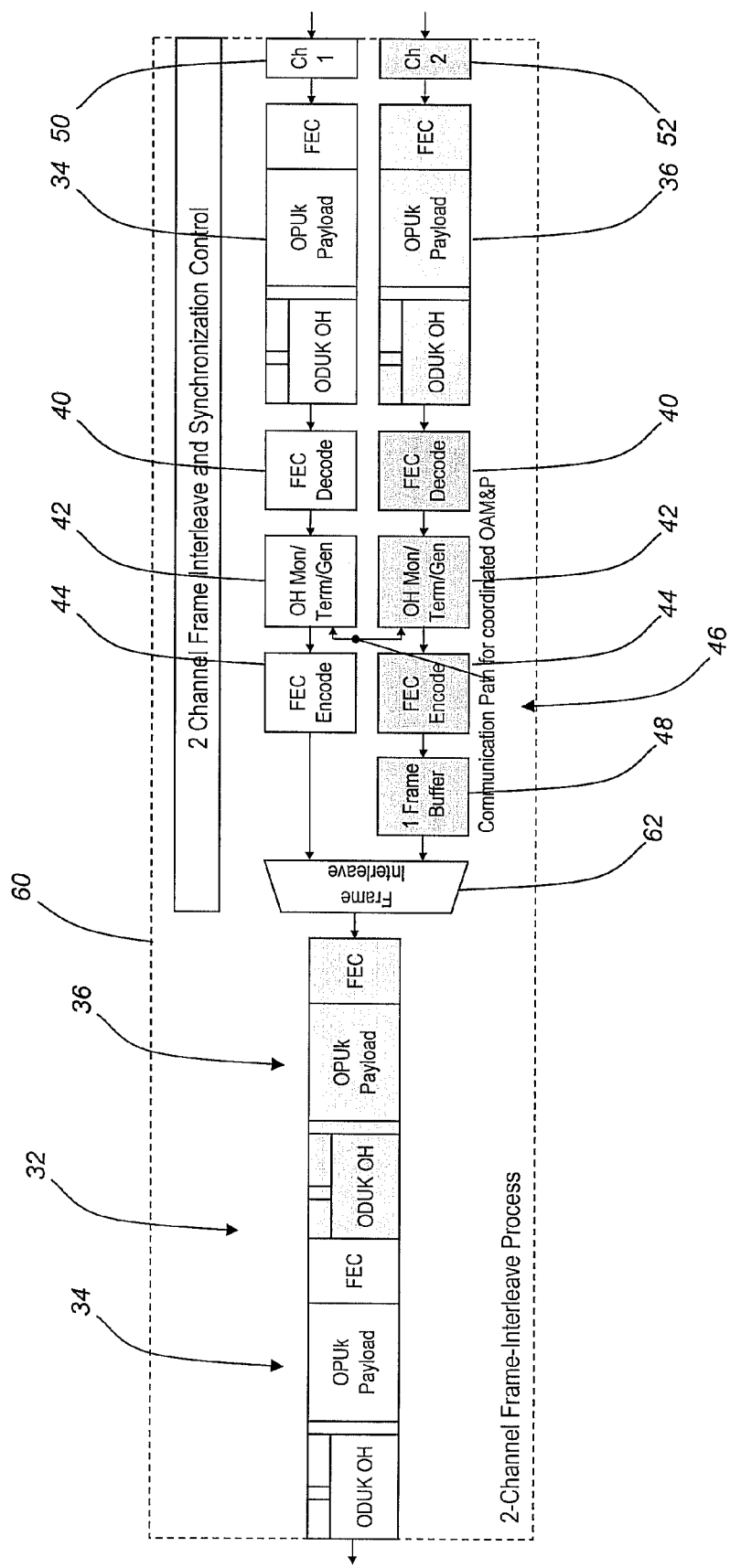
FIG. 3 is a schematic diagram illustrating one exemplary embodiment of a two-channel frame-interleaving process of the present invention.

FIG. 2 is a schematic diagram illustrating one exemplary embodiment of a two-channel frame-deinterleaving process 30 of the present invention. First, a client data signal 32 consisting of odd OTUK frames 34 (illustrated in white) and even OTUK frames 36 (illustrated in gray) is frame-deinterleaved into its constituent odd OTUK frames 34 and even OTUK frames 36 by a frame-deinterleaver 38. Next, the odd frames 34 and even frames 36 are each FEC decoded by an FEC decoder 40, OH monitoring/termination/generation is performed by an OH monitor/terminator/generator 42, and FEC encoding is performed by an FEC encoder 44. Preferably, the OH monitors/terminators/generators 42 share a communication path 46, such that OAM&P can be coordinated. Finally, a one-frame buffer 48 is inserted into the odd frame-path and channel 1 50, consisting of the odd frames 34, and channel 2 52, consisting of the even frames 36, result. This two-channel frame-deinterleaving process 30 is electrical throughout and each channel 50 and 52 can be transmitted over a single wavelength. This example can apply to any OTUK frame, but is especially applicable to OTU4 frames due to their relatively high data rate—with the high-data rate base signal being transmitted over two lower-data rate signals. FEC decoding/encoding and OH monitoring/termination/generation is correspondingly enabled in two lower-speed circuits. These concepts can be extended to OTU4 over $2^N$ channels, where N=1, 2, etc. This enables the transmission of a high-data rate base signal over $2^N$ signals at $½^N$ the data rate of the high-data rate base signal and OH monitoring/termination/generation in $2^N$ lower-speed circuits. The MF bytes 14 (FIG. 1) are used to select the odd/even frames 34 and 36 for the frame-deinterleave process 30, as well as to ensure proper frame ordering for the frame-interleave process 60 (FIG. 3). The odd (even) frame bit parity overhead (BIP OH) applies to BIP errors over channel 1 (channel 2). Preferably, FEC is terminated each frame. The OH in each frame is monitored for errors, faults, maintenance signals, and performance signals, and can be terminated/generated as required. Advantageously, multi-frame OAM&P can be coordinated between the two channels. Finally, larger interleave frame buffers can be used to accommodate large transport-induced skews between the two channels. Skews approaching 64 frames and larger can be accommodated by adding a secondary counter in unused OH that increments every full multi-frame, for example.

FIG. 3 is a schematic diagram illustrating one exemplary embodiment of a two-channel frame-interleaving process 60 of the present invention. First, channel 1 50, consisting of the odd OTUK frames 34 (again illustrated in white), and channel 2 52, consisting of the even OTUK frames 36 (again illustrated in gray), are each FEC decoded by an FEC decoder 40, OH monitoring/termination/generation is performed by an OH monitor/terminator/generator 42, and FEC encoding is performed by an FEC encoder 44. Preferably, the OH monitors/terminators/generators 42 share a communication path 46, such that OAM&P can be coordinated. Next, a one-frame buffer 48 is inserted into the even frame-path. Finally, the odd frames 34 and even frames 36 are frame-interleaved into the client data signal 32 by a frame-interleaver 62. Again, this two-channel frame-interleaving process 60 is electrical throughout and each channel 50 and 52 can be transmitted over a single wavelength. This example can apply to any OTUK frame, but is especially applicable to OTU4 frames due to their relatively high data rate—with the high-data rate base signal being transmitted over two lower-data rate signals. FEC decoding/encoding and OH monitoring/termination/generation is correspondingly enabled in two lower-speed circuits. These concepts can be extended to OTU4 over $2^N$ channels, where N=1, 2, etc. This enables the transmission of a high-data rate base signal over $2^N$ signals at $\frac{1}{2^N}$ the data rate of the high-data rate base signal and OH monitoring/termination/generation in $2^N$ lower-speed circuits. The MF bytes 14 (FIG. 1) are used to select the odd/even frames 34 and 36 for the frame-deinterleave process 30 (FIG. 2), as well as to ensure proper frame ordering for the frame-interleave process 60. The odd (even) frame BIP OH applies to BIP errors over channel 1 (channel 2). Preferably, FEC is terminated each frame. The OH in each frame is monitored for errors, faults, maintenance signals, and performance signals, and can be terminated/generated as required. Advantageously, multi-frame OAM&P can be coordinated between the two channels. Finally, larger interleave frame buffers can be used to accommodate large transport-induced skews between the two channels. Skews approaching 64 frames and larger can be accommodated by adding a secondary counter in unused OH that increments every full multi-frame, for example.

Figure 4:
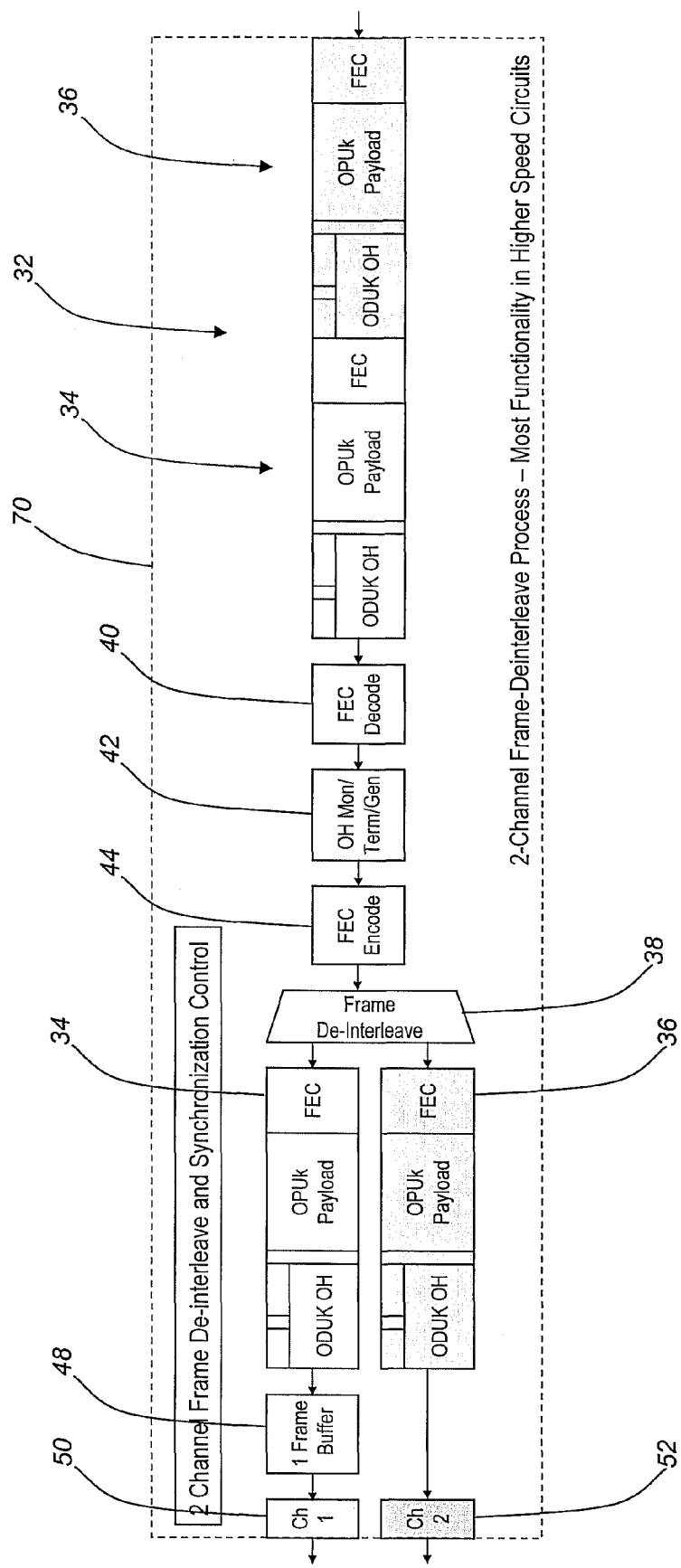
FIG. 4 is a schematic diagram illustrating another exemplary embodiment of a two-channel frame-deinterleaving process of the present invention—with most functionality partitioned to higher speed circuits.

FIG. 4 is a schematic diagram illustrating another exemplary embodiment of a two-channel frame-deinterleaving process 70 of the present invention—with most functionality partitioned to higher speed circuits. First, the client data signal 32 consisting of the odd OTUK frames 34 (again illustrated in white) and the even OTUK frames 36 (again illustrated in gray) is FEC decoded by an FEC decoder 40, OH monitoring/termination/generation is performed by an OH monitor/terminator/generator 42, and FEC encoding is performed by an FEC encoder 44. Next, the client data signal 32 is frame-deinterleaved into its constituent odd OTUK frames 34 and even OTUK frames 36 by a frame-deinterleaver 38. Finally, a one-frame buffer 48 is inserted into the odd frame-path and channel 1 50, consisting of the odd frames 34, and channel 2 52, consisting of the even frames 36, result.

Figure 5:
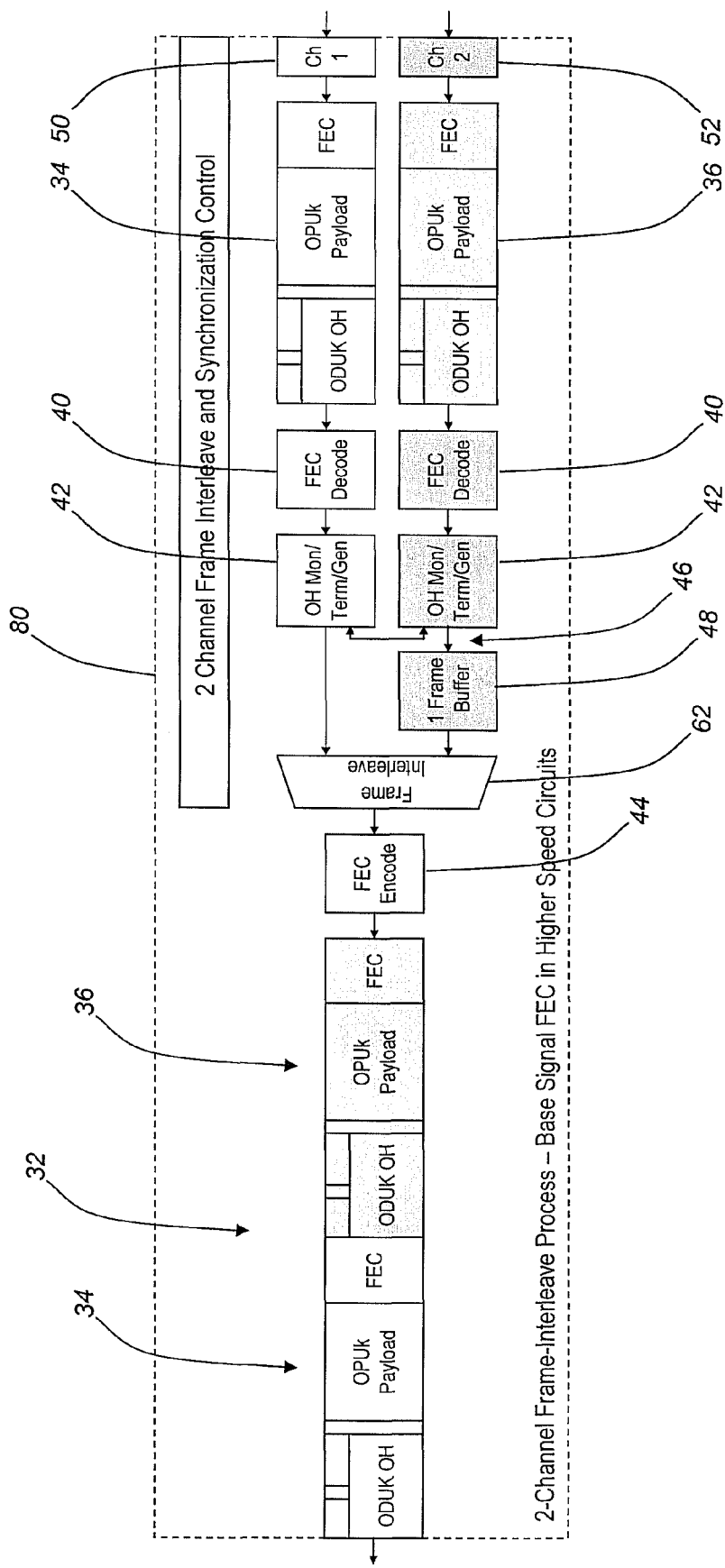
FIG. 5 is a schematic diagram illustrating another exemplary embodiment of a two-channel frame-interleaving process of the present invention—with base signal forward error correction (FEC) partitioned to higher speed circuits.

FIG. 5 is a schematic diagram illustrating another exemplary embodiment of a two-channel frame-interleaving process 80 of the present invention—with base signal FEC partitioned to higher speed circuits. First, channel 1 50, consisting of the odd OTUK frames 34 (again illustrated in white), and channel 2 52, consisting of the even OTUK frames 36 (again illustrated in gray), are each FEC decoded by an FEC decoder 40 and OH monitoring/termination/generation is performed by an OH monitor/terminator/generator 42. Preferably, the OH monitors/terminators/generators 42 share a communication path 46, such that OAM&P can be coordinated. Next, a one-frame buffer 48 is inserted into the even frame-path. Finally, the odd frames 34 and even frames 36 are frame-interleaved into the client data signal 32 by a frame-interleaver 62 and FEC encoding is performed by an FEC encoder 44.

Figure 6:
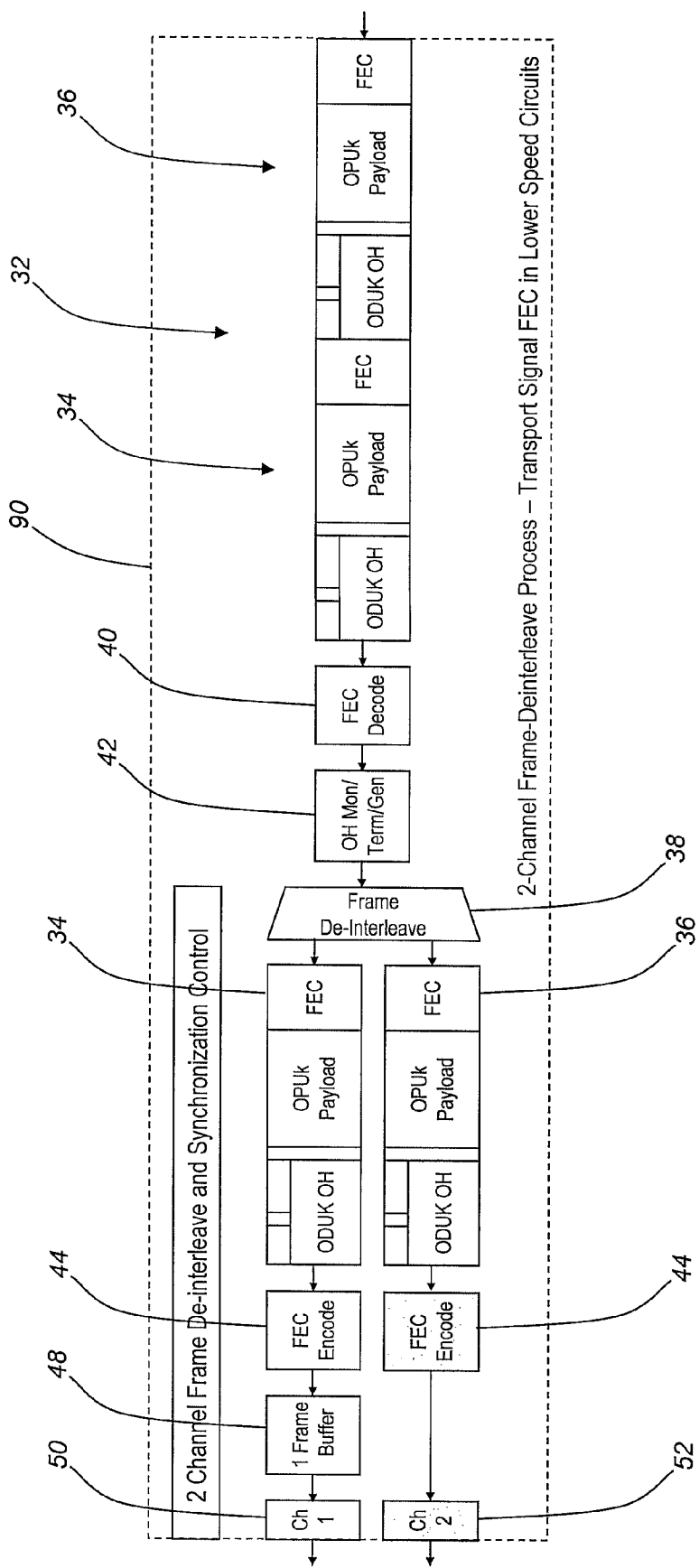
FIG. 6 is a schematic diagram illustrating a further exemplary embodiment of a two-channel frame-deinterleaving process of the present invention—with transport signal FEC partitioned to lower speed circuits.

FIG. 6 is a schematic diagram illustrating a further exemplary embodiment of a two-channel frame-deinterleaving process 90 of the present invention—with transport signal FEC partitioned to lower speed circuits. First, the client data signal 32 consisting of the odd OTUK frames 34 (again illustrated in white) and the even OTUK frames 36 (again illustrated in gray) is FEC decoded by an FEC decoder 40 and OH monitoring/termination/generation is performed by an OH monitor/terminator/generator 42. Next, the client data signal 32 is frame-deinterleaved into its constituent odd OTUK frames 34 and even OTUK frames 36 by a frame-deinterleaver 38. Subsequently, each of the odd frames 34 and even frames 36 are FEC encoded by an FEC encoder 44. Finally, a one-frame buffer 48 is inserted into the odd frame-path and channel 1 50, consisting of the odd frames 34, and channel 2 52, consisting of the even frames 36, result.

Figure 7:
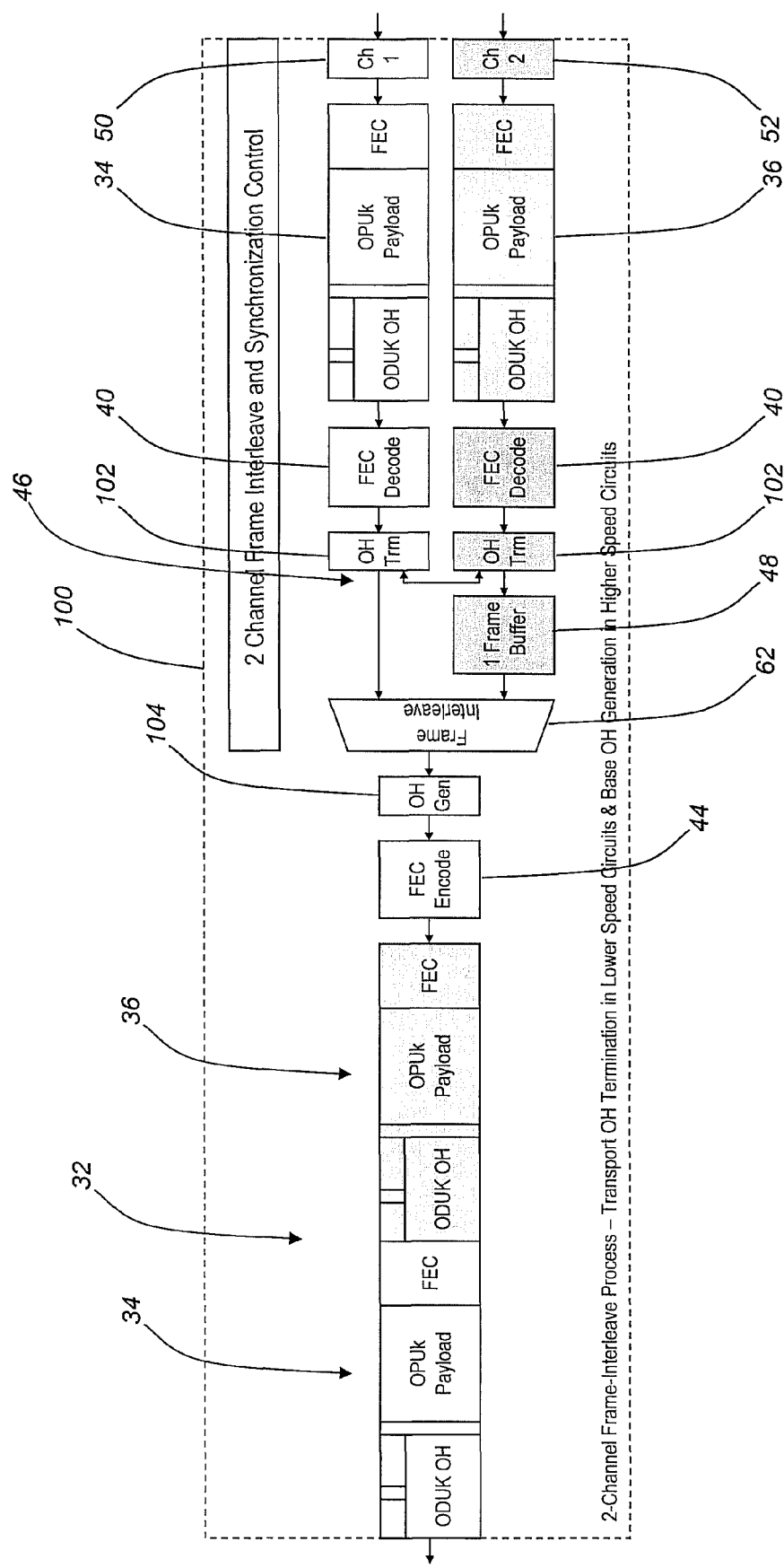
FIG. 7 is a schematic diagram illustrating a further exemplary embodiment of a two-channel frame-interleaving process of the present invention—with transport signal overhead (OH) termination partitioned to lower speed circuits and base signal OH generation partitioned to higher speed circuits.

FIG. 7 is a schematic diagram illustrating a further exemplary embodiment of a two-channel frame-interleaving process 100 of the present invention—with transport signal OH termination partitioned to lower speed circuits and base signal OH generation partitioned to higher speed circuits. First, channel 1 50, consisting of the odd OTUK frames 34 (again illustrated in white), and channel 2 52, consisting of the even OTUK frames 36 (again illustrated in gray), are each FEC decoded by an FEC decoder 40 and OH termination is performed by an OH terminator 102. Preferably, the OH terminators 102 share a communication path 46, such that OAM&P can be coordinated. Next, a one-frame buffer 48 is inserted into the even frame-path. Finally, the odd frames 34 and even frames 36 are frame-interleaved into the client data signal 32 by a frame-interleaver 62, OH generation is performed by an OH generator 104, and FEC encoding is performed by an FEC encoder 44.

Figure 8:
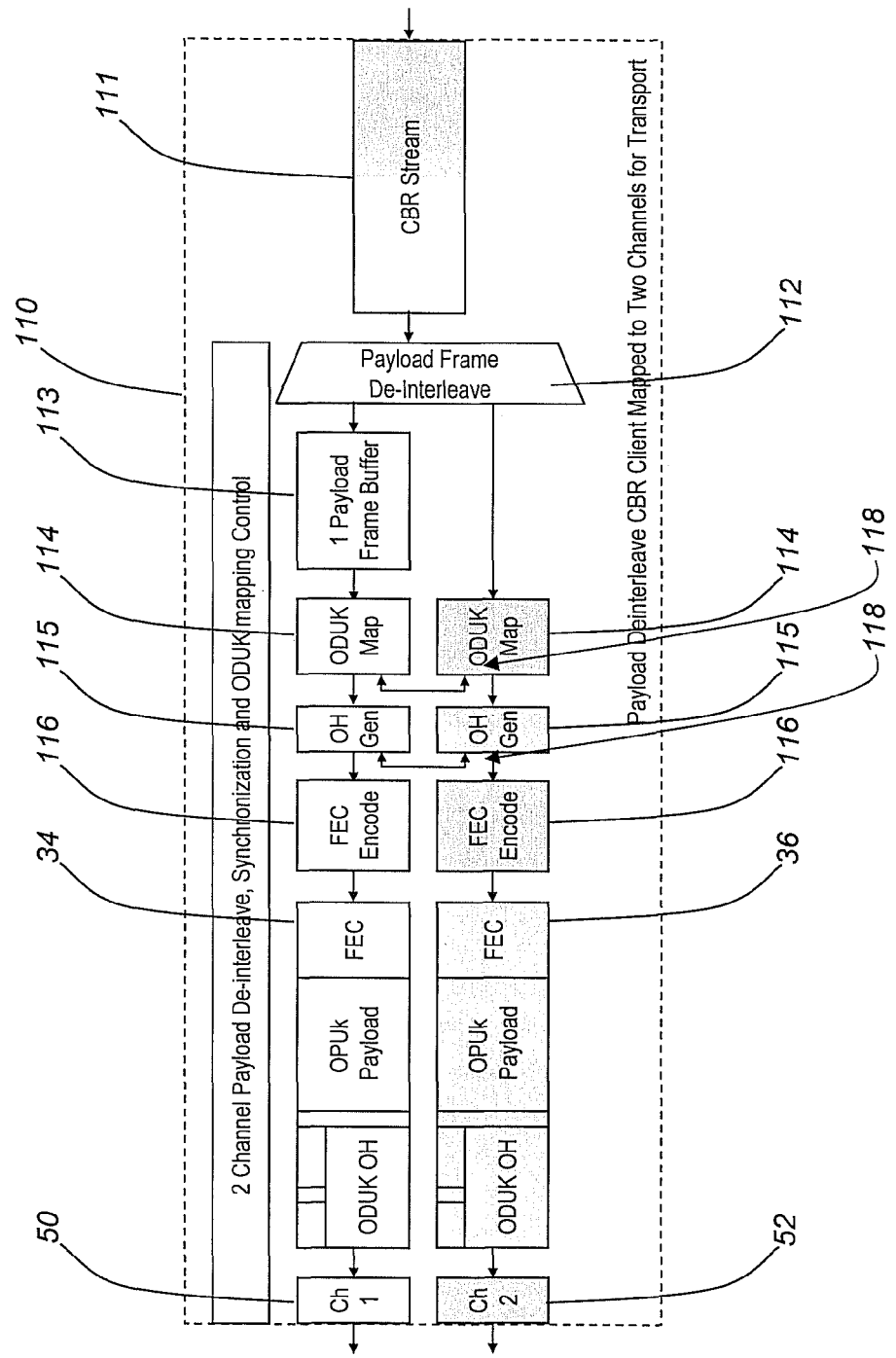
FIG. 8 is a schematic diagram illustrating one exemplary embodiment of a Constant Bit Rate (CBR) client frame-deinterleaving process of the present invention—with the CBR client mapped to two channels for transport.

FIG. 8 is a schematic diagram illustrating one exemplary embodiment of a Constant Bit Rate (CBR) client frame-deinterleaving process 110 of the present invention—with the CBR client mapped to two channels for transport. First, a CBR stream 111 consisting of a future odd frame portion (illustrated in white) and a future even frame portion (illustrated in gray) is frame-deinterleaved into odd OTUK frames 34 and even OTUK frames 36 by a payload frame-deinterleaver 112. Next, a one-payload frame buffer 113 is inserted into the odd frame-path. Subsequently, each of the odd frames 34 and even frames 34 is ODUK mapped by an ODUK mapper 114, OH generation is performed by an OH generator 115, and FEC encoding is performed by an FEC encoder 116. Preferably, the ODUK mappers 114 and OH generators 115 each share a communication path 118, such that OAM&P can be coordinated. The output is channel 1 50, consisting of the odd frames 34, and channel 2 52, consisting of the even frames 36. This process 110 could apply to any client signal mapped into an OTU4 frame, such as a 100 GbE client signal at 103.125 Gb/s, a 100 GbE client signal that is FEC decoded and Generic Framing Protocol (GFP) mapped, etc. It can be extended to OTU4 over $2^N$ channels, where N=1, 2, etc. For synchronized CBR mappings, control of the payload frame-deinterleave/interleave and payload frame buffer operate with a constant relationship between the client bytes and transport bytes available. Functionality can be portioned to optimize the use of low-speed and high-speed circuits and supports different deinterleave/interleave partitioning. For asynchronous CBR mappings, control of the payload frame-deinterleave/interleave and payload frame buffer adjust timing an buffer size according to the applicable justification requirements between the client bytes and transport bytes available. For GFP mappings, control of the payload frame-deinterleave/interleave and payload frame buffer operate with a constant relationship between the GFP bytes and transport bytes available. A GFP mapper adjusts between the GFP bytes available and the client bytes.

Figure 9:
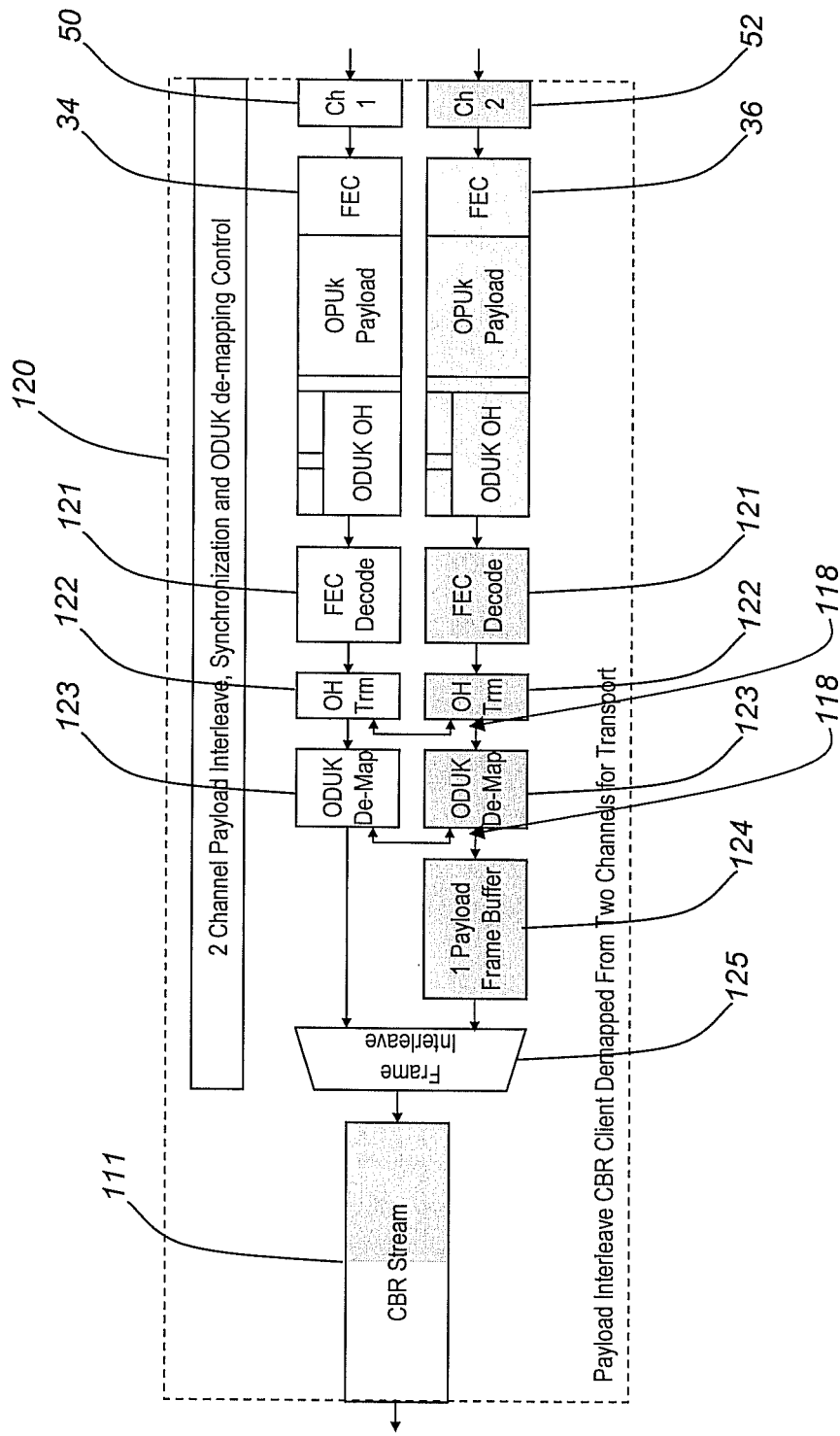
FIG. 9 is a schematic diagram illustrating one exemplary embodiment of a CBR client frame-interleaving process of the present invention—with the CBR client demapped from two channels for transport.

FIG. 9 is a schematic diagram illustrating one exemplary embodiment of a CBR client frame-interleaving process 120 of the present invention—with the CBR client demapped from two channels for transport. First, channel 1 50, consisting of the odd OTUK frames 34 (again illustrated in white), and channel 2 52, consisting of the even OTUK frames 36 (again illustrated in gray), are each FEC decoded by an FEC decoder 121, OH termination is performed by an OH terminator 122, and ODUK demapping is performed by an ODUK demapper 123. Preferably, the OH terminators 122 and ODUK demappers 123 each share a communication path 118, such that OAM&P can be coordinated. Next, a one-payload frame buffer 124 is inserted into the even frame-path. Finally, the odd frames 34 and even frames 36 are frame-interleaved into the CBR stream 111 by a payload frame-interleaver 125. Again, this process 120 could apply to any client signal mapped into an OTU4 frame, such as a 100 GbE client signal at 103.125 Gb/s, a 100 GbE client signal that is FEC decoded and GFP mapped, etc. It can be extended to OTU4 over $2^N$ channels, where N=1, 2, etc. For synchronized CBR mappings, control of the payload frame-deinterleave/interleave and payload frame buffer operate with a constant relationship between the client bytes and transport bytes available. Functionality can be portioned to optimize the use of low-speed and high-speed circuits and supports different deinterleave/interleave partitioning. For asynchronous CBR mappings, control of the payload frame-deinterleave/interleave and payload frame buffer adjust timing an buffer size according to the applicable justification requirements between the client bytes and transport bytes available. For GFP mappings, control of the payload frame-deinterleave/interleave and payload frame buffer operate with a constant relationship between the GFP bytes and transport bytes available. A GFP mapper adjusts between the GFP bytes available and the client bytes.

Figure 10:
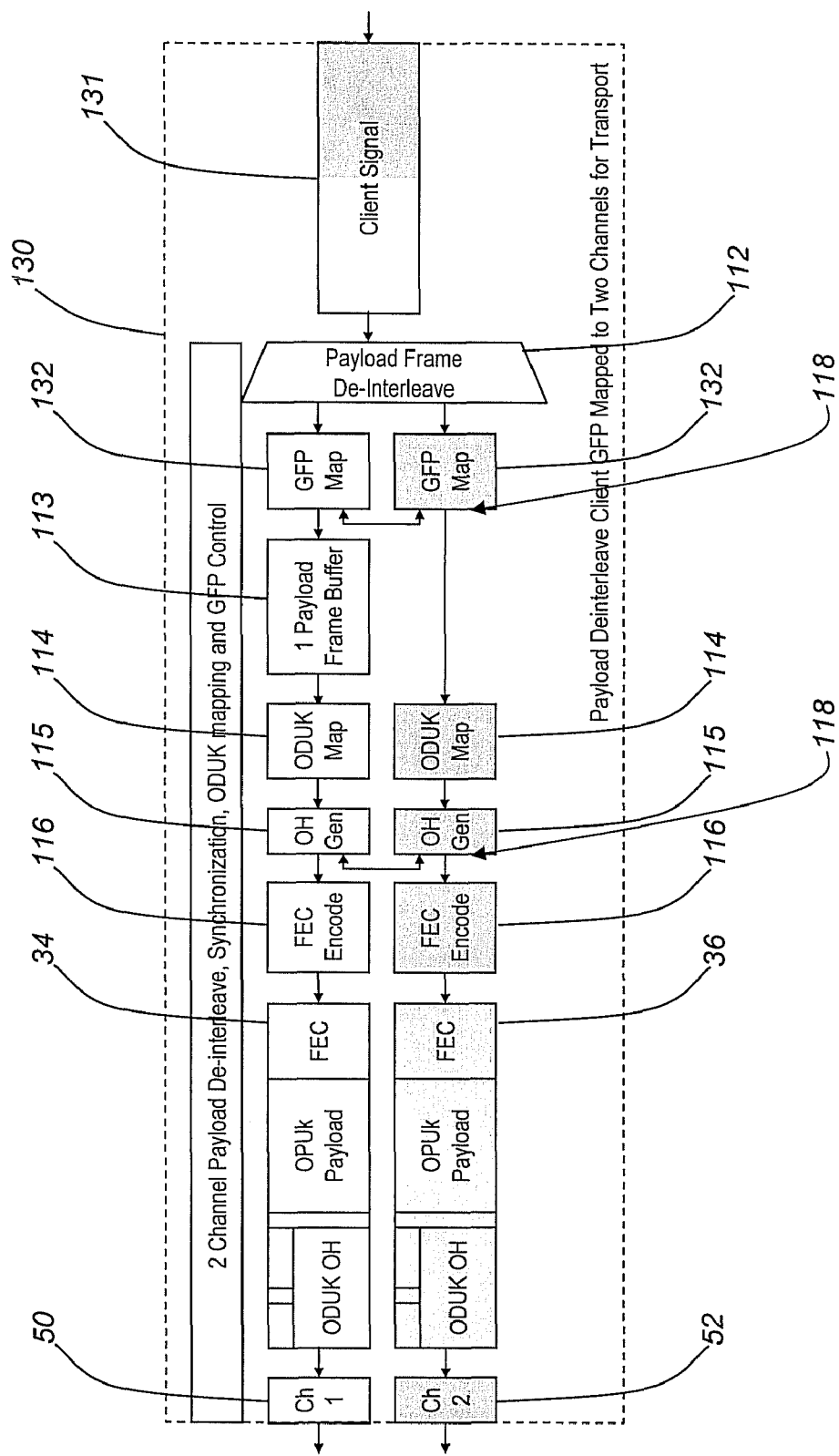
FIG. 10 is a schematic diagram illustrating one exemplary embodiment of a client signal frame-deinterleaving process of the present invention—with the client signal Generic Framing Protocol (GFP) mapped to two channels for transport.

FIG. 10 is a schematic diagram illustrating one exemplary embodiment of a client signal frame-deinterleaving process 130 of the present invention—with the client signal GFP mapped to two channels for transport. First, a client signal 131 consisting of a future odd frame portion (again illustrated in white) and a future even frame portion (again illustrated in gray) is frame-deinterleaved into odd OTUK frames 34 and even OTUK frames 36 by a payload frame-deinterleaver 112. Next, each of the odd and even streams is GFP mapped by a GFP mapper 132. Next, a one-payload frame buffer 113 is inserted into the odd frame-path. Subsequently, each of the odd frames 34 and even frames 34 is ODUK mapped by an ODUK mapper 114, OH generation is performed by an OH generator 115, and FEC encoding is performed by an FEC encoder 116. Preferably, the GFP mappers 132 and OH generators 115 each share a communication path 118, such that OAM&P can be coordinated. The output is channel 1 50, consisting of the odd frames 34, and channel 2 52, consisting of the even frames 36.

Figure 11:
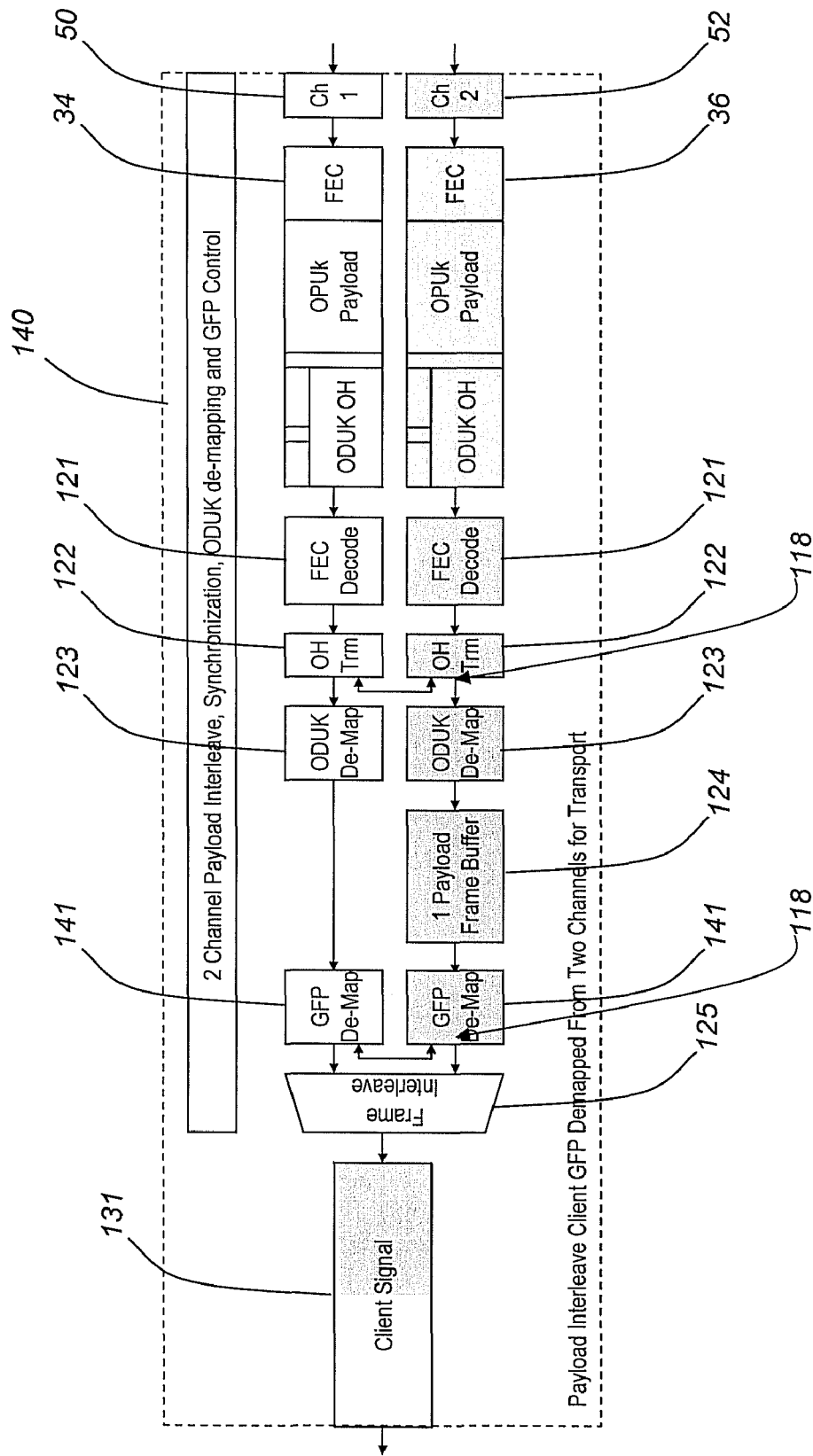
FIG. 11 is a schematic diagram illustrating one exemplary embodiment of a client signal frame-interleaving process of the present invention—with the client signal GFP demapped from two channels for transport.

FIG. 11 is a schematic diagram illustrating one exemplary embodiment of a client signal frame-interleaving process 140 of the present invention—with the client signal GFP demapped from two channels for transport. First, channel 1 50, consisting of the odd OTUK frames 34 (again illustrated in white), and channel 2 52, consisting of the even OTUK frames 36 (again illustrated in gray), are each FEC decoded by an FEC decoder 121, OH termination is performed by an OH terminator 122, and ODUK demapping is performed by an ODUK demapper 123. Next, a one-payload frame buffer 124 is inserted into the even frame-path. Next, each of the odd and even streams is GFP demapped by a GFP demapper 141. Preferably, the OH terminators 122 and GFP demappers 141 each share a communication path 118, such that OAM&P can be coordinated. Finally, the odd frames 34 and even frames 36 are frame-interleaved into the client signal 131 by a payload frame-interleaver 125.

Figure 12:
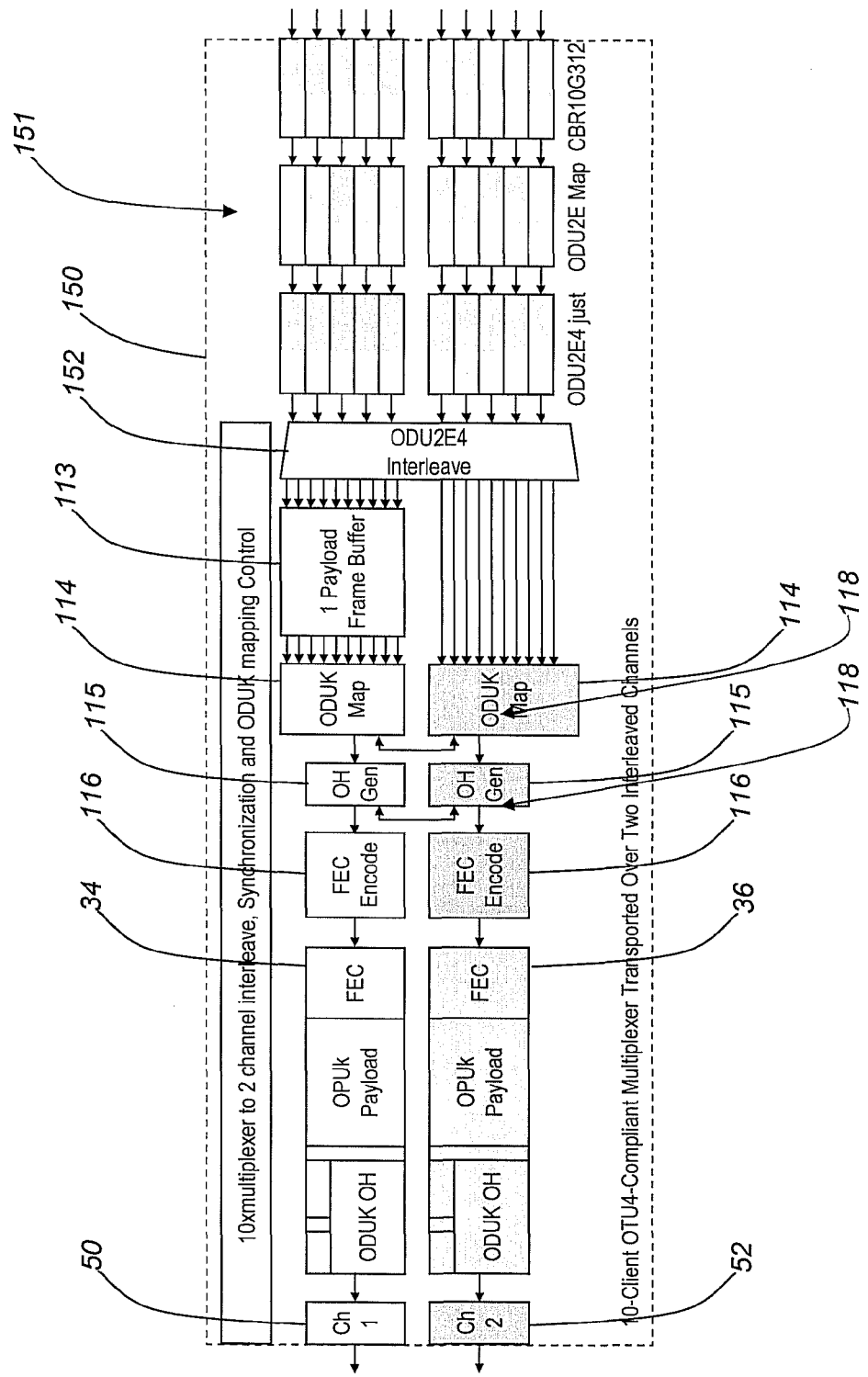
FIG. 12 is a schematic diagram illustrating one exemplary embodiment of a 10-client OTU4-compliant multiplexer transported over two interleaved channels in accordance with the systems and methods of the present invention.

FIG. 12 is a schematic diagram illustrating one exemplary embodiment of a 10-client OTU4-compliant multiplexer transported over two interleaved channels in accordance with the systems and methods 150 of the present invention. First, an N-client stream 151 consisting of a future odd frame portion (illustrated in white) and a future even frame portion (illustrated in gray) is interleaved into odd OTUK frames 34 and even OTUK frames 36 by an ODU2E4 interleaver 152. Next, a one-payload frame buffer 113 is inserted into the odd frame-path. Subsequently, each of the odd frames 34 and even frames 34 is ODUK mapped by an ODUK mapper 114, OH generation is performed by an OH generator 115, and FEC encoding is performed by an FEC encoder 116. Preferably, the ODUK mappers 114 and OH generators 115 each share a communication path 118, such that OAM&P can be coordinated. The output is channel 1 50, consisting of the odd frames 34, and channel 2 52, consisting of the even frames 36. This process 150 could apply to 10× or $2^N$ clients multiplexed into an OTU4, for example. Exemplary clients include 10 GbE LAN, 10 GbE WAN, 10 GbE GFP mapped, OC192, OTU2, OTU2E, ODU2 LAN, and combinations thereof. The functionality can be apportioned to optimize the use of low-speed and high-speed circuits and supports differing deinterleaving and interleaving partitioning. An OTU4-compatible process 150 produces an OTU4 stream with 10 tribs multiplexed into each frame, but requires payload coordination between channels. A non-compatible process 160 (FIG. 13) results in OTU4 frames with the first 5 tribs multiplexed into odd frames and the second 5 tribs multiplexed into even frames, creating two 5-trib multiplexing framers but not requiring interleave/deinterleave.

Figure 13:
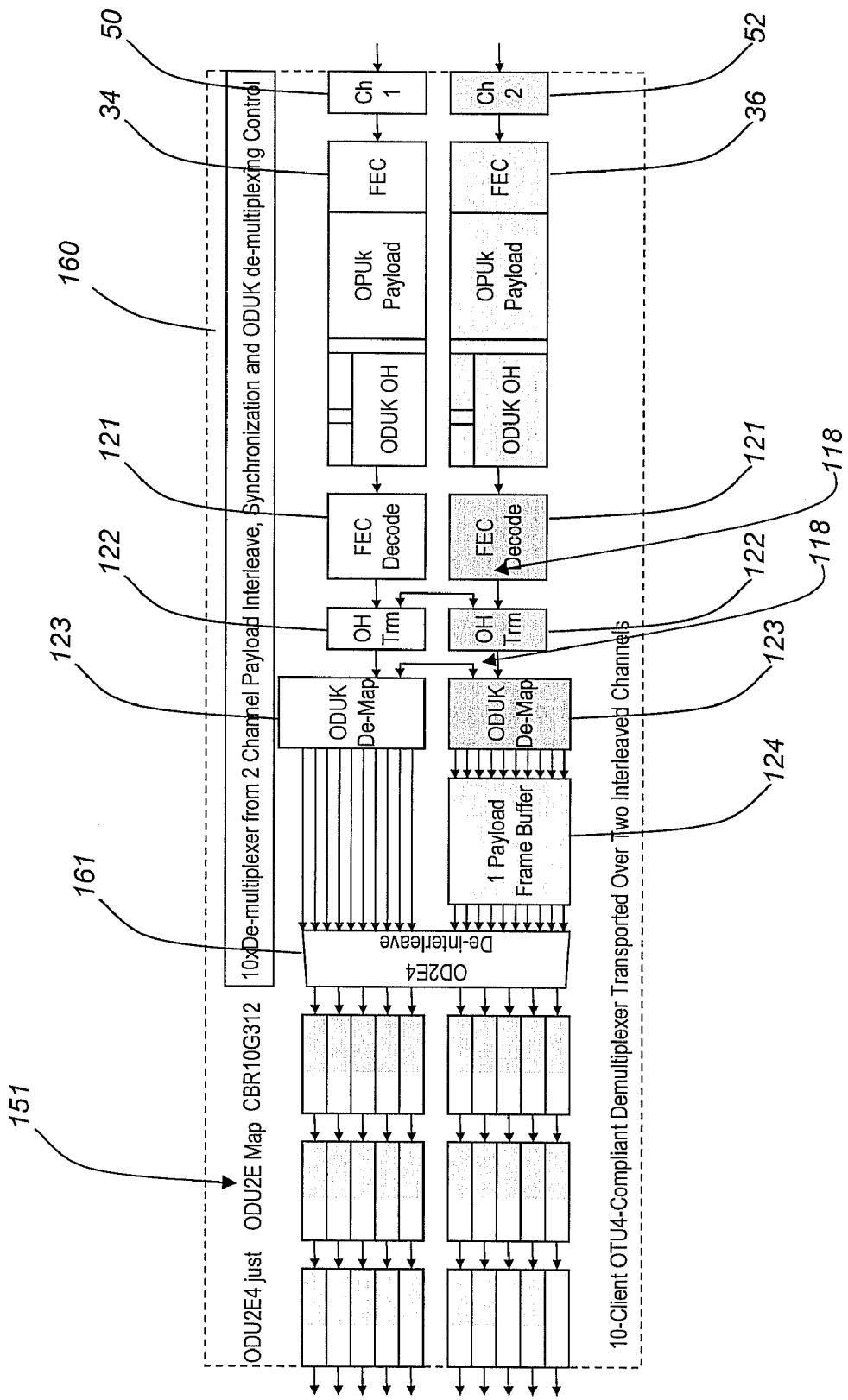
FIG. 13 is a schematic diagram illustrating one exemplary embodiment of a 10-client OTU4-compliant demultiplexer transported over two interleaved channels in accordance with the systems and methods of the present invention.

FIG. 13 is a schematic diagram illustrating one exemplary embodiment of a 10-client OTU4-compliant demultiplexer transported over two interleaved channels in accordance with the systems and methods 160 of the present invention. First, channel 1 50, consisting of the odd OTUK frames 34 (again illustrated in white), and channel 2 52, consisting of the even OTUK frames 36 (again illustrated in gray), are each FEC decoded by an FEC decoder 121, OH termination is performed by an OH terminator 122, and ODUK demapping is performed by an ODUK demapper 123. Preferably, the OH terminators 122 and ODUK demappers 123 each share a communication path 118, such that OAM&P can be coordinated. Next, a one-payload frame buffer 124 is inserted into the even frame-path. Finally, the odd frames 34 and even frames 36 are deinterleaved into the N-client stream 151 by an ODU2E4 deinterleaver 161. Again, this process 160 could apply to 10× or $2^N$ clients multiplexed into an OTU4, for example. Exemplary clients include 10 GbE LAN, 10 GbE WAN, 10 GbE GFP mapped, OC192, OTU2, OTU2E, ODU2

LAN, and combinations thereof. The functionality can be apportioned to optimize the use of low-speed and high-speed circuits and supports differing deinterleaving and interleaving partitioning. An OTU4-compatible process 150 (FIG. 12) produces an OTU4 stream with 10 tribs multiplexed into each frame, but requires payload coordination between channels. A non-compatible process 160 results in OTU4 frames with the first 5 tribs multiplexed into odd frames and the second 5 tribs multiplexed into even frames, creating two 5-trib multiplexing framers but not requiring interleave/deinterleave.

Figure 14:
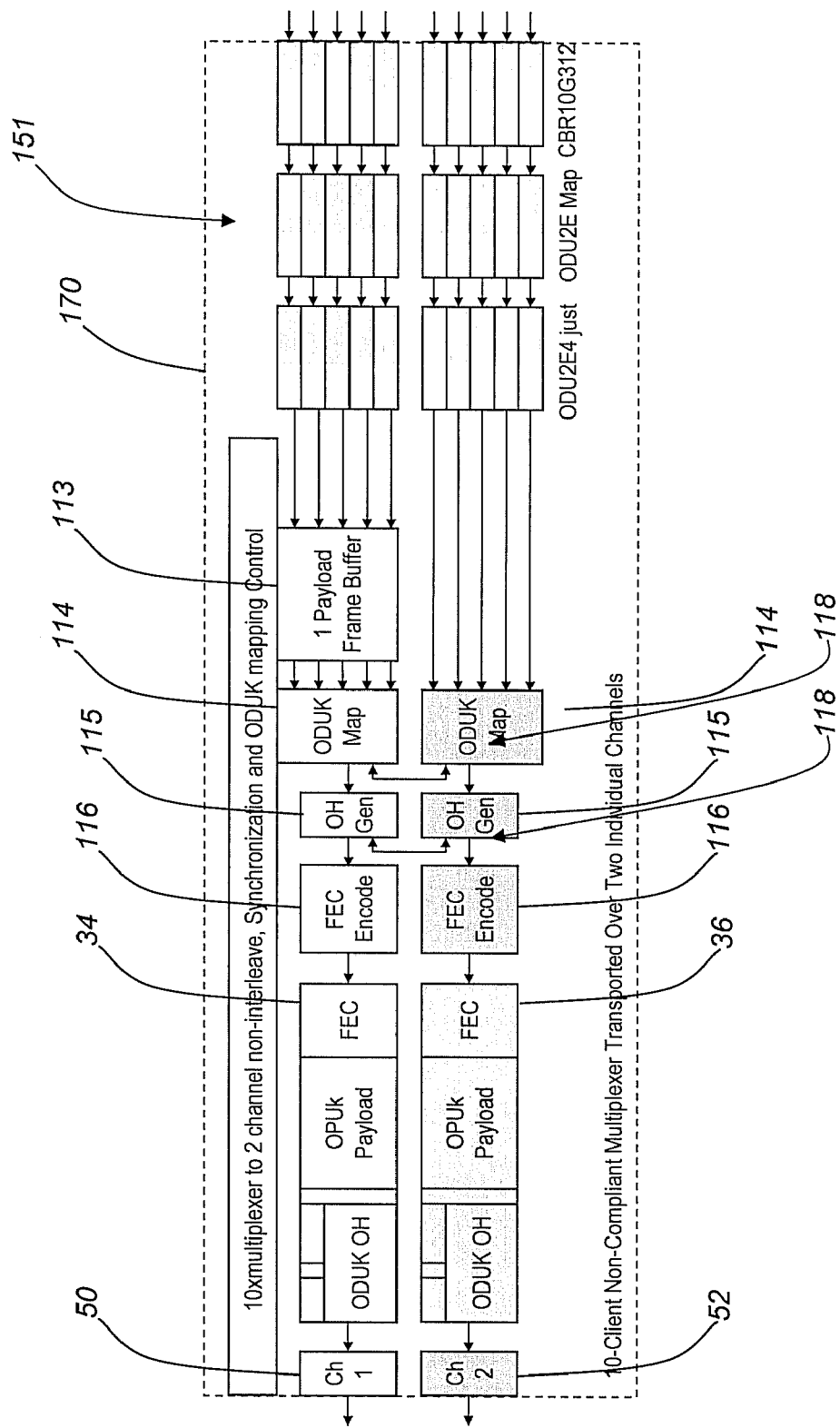
FIG. 14 is a schematic diagram illustrating one exemplary embodiment of a 10-client non-compliant multiplexer transported over two individual channels in accordance with the systems and methods of the present invention.

FIG. 14 is a schematic diagram illustrating one exemplary embodiment of a 10-client non-compliant multiplexer transported over two individual channels in accordance with the systems and methods 170 of the present invention. First, an N-client stream 151 consisting of a future odd frame portion (again illustrated in white) and a future even frame portion (again illustrated in gray) is received. Next, a one-payload frame buffer 113 is inserted into the odd frame-path. Subsequently, each of the odd frames 34 and even frames 34 is ODUK mapped by an ODUK mapper 114, OH generation is performed by an OH generator 115, and FEC encoding is performed by an FEC encoder 116. Preferably, the ODUK mappers 114 and OH generators 115 each share a communication path 118, such that OAM&P can be coordinated. The output is channel 1 50, consisting of the odd frames 34, and channel 2 52, consisting of the even frames 36.

Figure 15:
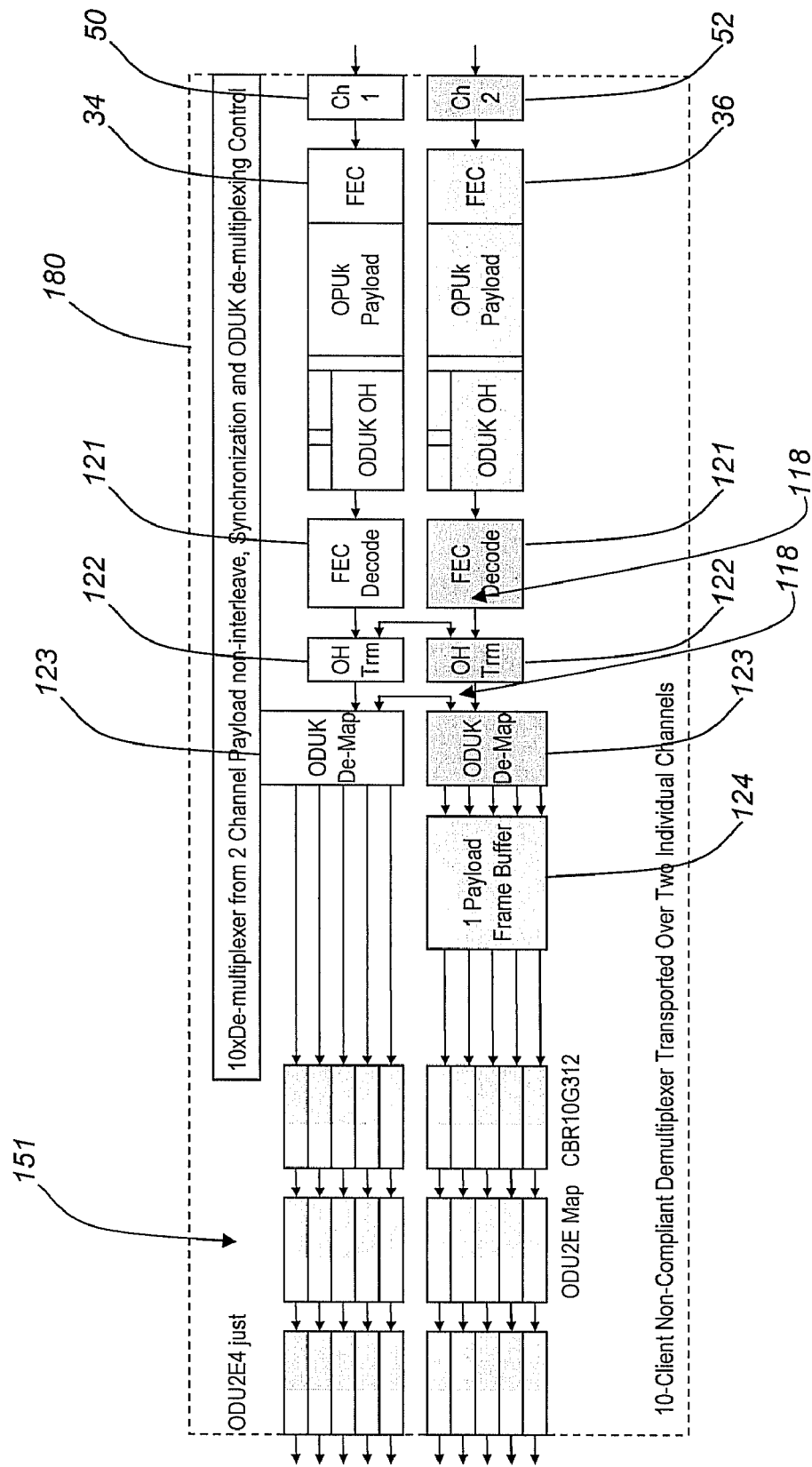
FIG. 15 is a schematic diagram illustrating one exemplary embodiment of a 10-client non-compliant demultiplexer transported over two individual channels in accordance with the systems and methods of the present invention.

FIG. 15 is a schematic diagram illustrating one exemplary embodiment of a 10-client non-compliant demultiplexer transported over two individual channels in accordance with the systems and methods 180 of the present invention. First, channel 1 50, consisting of the odd OTUK frames 34 (again illustrated in white), and channel 2 52, consisting of the even OTUK frames 36 (again illustrated in gray), are each FEC decoded by an FEC decoder 121, OH termination is performed by an OH terminator 122, and ODUK demapping is performed by an ODUK demapper 123. Preferably, the OH terminators 122 and ODUK demappers 123 each share a communication path 118, such that OAM&P can be coordinated. Next, a one-payload frame buffer 124 is inserted into the even frame-path. Finally, the N-client stream 151 is output.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A transport method, comprising:
   receiving an aggregate client signal;
   frame-deinterleaving the aggregate client signal across N paths, each of the N paths carrying one of every N frames into which the aggregate client signal is frame-deinterleaved;
   performing overhead monitoring/termination/generation for each of the N paths one of prior to and subsequent to deinterleaving;
   performing one or more of forward error correction decoding and encoding for each of the N paths one of prior to and subsequent to deinterleaving; and
   performing mapping for each of the N paths one of prior to and subsequent to deinterleaving;
   wherein each of the N paths comprise an overhead monitor for performing path operations, administration, maintenance, and provisioning functions for a corresponding path, and wherein the overhead monitors are in communication with one another for performing coordinated path operations, administration, maintenance, and provisioning functions therebetween.

2. The transport method of claim 1, wherein each of the N paths comprise a set of Optical Transport Network (OTN) overhead for individual path operations, administration, maintenance, and provisioning (OAM&P).

3. The transport method of claim 1, wherein each of the N paths comprise a set of Optical Transport Network (OTN) overhead for coordinated path operations, administration, maintenance, and provisioning (OAM&P).

4. The transport method of claim 1, further comprising wherein performing the mapping comprises performing Optical Data Unit K (ODUK) mapping for each of the N paths subsequent to deinterleaving.

5. The transport method of claim 1, further comprising wherein performing the mapping comprises performing Generic Framing Protocol (GFP) mapping for each of the N paths subsequent to deinterleaving.

6. The transport method of claim 1, further comprising inserting one or more frame buffers into selected paths of the N paths subsequent to deinterleaving.

7. The transport method of claim 1, wherein the aggregate client signal comprises an aggregate client signal selected from the group consisting of an Optical Transport Unit 4 (OTU4) client signal, an Optical Transport Unit K (OTUK) client signal, a constant bit rate (CBR) client signal, a 100 Gb/s (100G) client signal, a 100 Gb/s Ethernet (100 GbE) Local Area Network (LAN) client signal, a 100 Gb/s Ethernet (100 GbE) Wide Area Network (WAN) client signal, a 100 Gb/s Ethernet (100 GbE) Generic Framing Protocol (GFP)-mapped client signal, a 10 Gb/s Ethernet (10 GbE) client signal, an Optical Channel 192 (OC 192) client signal, an Optical Transport Unit 2 (OTU2) client signal, an Optical Transport Unit 2E (OTU2E) client signal, an Optical Data Unit 2 (ODU2) client signal, an Optical Data Unit 2 (ODU2) Local Area Network (LAN) (ODU2L) client signal, a subset thereof, an aggregation thereof, and a combination thereof.

8. The transport method of claim 1, wherein the N frames comprise OTUK frames.

9. A transport method, comprising:
   receiving N transport signals distributed across N paths;
   frame-interleaving the N transport signals to form an aggregate client signal, each of the N paths carrying one of every N frames from which the aggregate client signal is frame-interleaved;
   performing overhead monitoring/termination/generation for each of the N paths one of prior to and subsequent to interleaving;
   performing one or more of forward error correction decoding and encoding for each of the N paths one of prior to and subsequent to interleaving; and
   performing demapping for each of the N paths one of prior to and subsequent to interleaving;
   wherein each of the N paths comprise an overhead monitor for performing path operations, administration, maintenance, and provisioning functions for a corresponding path, and wherein the overhead monitors are in communication with one another for performing coordinated path operations, administration, maintenance, and provisioning functions therebetween.

10. The transport method of claim 9, wherein each of the N paths comprise a set of Optical Transport Network (OTN) overhead for individual path operations, administration, maintenance, and provisioning (OAM&P).

11. The transport method of claim 9, wherein each of the N paths comprise a set of Optical Transport Network (OTN) overhead for coordinated path operations, administration, maintenance, and provisioning (OAM&P).

12. The transport method of claim 9, further comprising wherein performing the demapping comprises performing Optical Data Unit K (ODUK) demapping for each of the N paths prior to interleaving.

13. The transport method of claim 9, further comprising wherein performing the demapping comprises performing Generic Framing Protocol (GFP) demapping for each of the N paths prior to interleaving.

14. The transport method of claim 9, further comprising inserting one or more frame buffers into selected paths of the N paths prior to interleaving.

15. The transport method of claim 9, wherein the aggregate client signal comprises an aggregate client signal selected from the group consisting of an Optical Transport Unit 4 (OTU4) client signal, an Optical Transport Unit K (OTUK) client signal, a constant bit rate (CBR) client signal, a 100 Gb/s (100G) client signal, a 100 Gb/s Ethernet (100 GbE) Local Area Network (LAN) client signal, a 100 Gb/s Ethernet (100 GbE) Wide Area Network (WAN) client signal, a 100 Gb/s Ethernet (100 GbE) Generic Framing Protocol (GFP)-mapped client signal, a 10 Gb/s Ethernet (10 GbE) client signal, an Optical Channel 192 (OC 192) client signal, an Optical Transport Unit 2 (OTU2) client signal, an Optical Transport Unit 2E (OTU2E) client signal, an Optical Data Unit 2 (ODU2) client signal, an Optical Data Unit 2 (ODU2) Local Area Network (LAN) (ODU2L) client signal, a subset thereof, an aggregation thereof, and a combination thereof.

16. The transport method of claim 9, wherein the N frames comprise OTUK frames.

17. A transport system, comprising:
one or more inputs for receiving an aggregate client signal; and
a frame-deinterleaver for frame-deinterleaving the aggregate client signal across N paths, each of the N paths carrying one of every N frames into which the aggregate client signal is frame-deinterleaved;
overhead monitoring/termination/generation for each of the N paths one of prior to and subsequent to deinterleaving;
one or more of forward error correction decoding and encoding for each of the N paths one of prior to and subsequent to deinterleaving; and
mapping for each of the N paths one of prior to and subsequent to deinterleaving;
wherein each of the N paths comprise an overhead monitor for performing path operations, administration, maintenance, and provisioning functions for a corresponding path, and wherein the overhead monitors are in communication with one another for performing coordinated path operations, administration, maintenance, and provisioning functions therebetween.

18. A transport system, comprising:
one or more inputs for receiving N transport signals distributed across N paths; and
a frame-interleaver for frame-interleaving the N transport signals to form an aggregate client signal, each of the N paths carrying one of every N frames from which the aggregate client signal is frame-interleaved;
overhead monitoring/termination/generation for each of the N paths one of prior to and subsequent to interleaving;
one or more of forward error correction decoding and encoding for each of the N paths one of prior to and subsequent to interleaving; and
demapping for each of the N paths one of prior to and subsequent to interleaving;
wherein each of the N paths comprise an overhead monitor for performing path operations, administration, maintenance, and provisioning functions for a corresponding path, and wherein the overhead monitors are in communication with one another for performing coordinated path operations, administration, maintenance, and provisioning functions therebetween.

19. A transport method, comprising:
transporting one of every N frames associated with an aggregate client signal over a selected one of N channels, wherein, when frame-interleaved, the N frames form at least a portion of the aggregate client signal; and
performing overhead monitoring/termination/generation one of prior to and subsequent to interleaving;
performing one or more of forward error correction decoding and encoding one of prior to and subsequent to interleaving; and
performing demapping one of prior to and subsequent to interleaving;
wherein each of the N channels comprise a set of Optical Transport Network overhead for individual path operations, administration, maintenance, and provisioning functions;
wherein each of the N channels comprise a set of Optical Transport Network overhead for coordinated path operations, administration, maintenance, and provisioning functions; and
wherein each of the N channels comprise an overhead monitor for performing path operations, administration, maintenance, and provisioning functions for a corresponding channel, and wherein the overhead monitors are in communication with one another for performing coordinated path operations, administration, maintenance, and provisioning functions therebetween.

* * * * *